United States Patent [19]
Hasegawa

[11] Patent Number: 5,408,454
[45] Date of Patent: Apr. 18, 1995

[54] TRACK JUMP CONTROLLING APPARATUS
[75] Inventor: Wataru Hasegawa, Tokorozawa, Japan
[73] Assignee: Pioneer Electronic Corporation, Tokyo, Japan
[21] Appl. No.: 67,442
[22] Filed: May 25, 1993
[30] Foreign Application Priority Data
May 26, 1992 [JP] Japan .................. 4-133950
[51] Int. Cl.⁶ .............................................. G11B 7/00
[52] U.S. Cl. .................. 369/44.25; 369/44.28; 369/44.32; 369/32
[58] Field of Search ................ 369/32, 44.25, 44.27, 369/44.28, 44.29, 44.26, 44.32, 48, 54, 50, 53; 360/77.01, 77.05

[56] References Cited
U.S. PATENT DOCUMENTS

| 4,745,587 | 5/1988 | Maeda et al. | 369/44.34 |
| 4,884,259 | 11/1989 | Horikawa et al. | 369/44.26 |
| 5,157,513 | 10/1992 | Yamashita | 369/44.32 |

FOREIGN PATENT DOCUMENTS
464986 1/1992 European Pat. Off. .
3-37187 8/1991 Japan .

Primary Examiner—Aristotelis Psitos
Assistant Examiner—Nabil Hindi
Attorney, Agent, or Firm—Kane, Dalsimer, Sullivan, Kurucz, Levy, Eisele and Richard

[57] ABSTRACT

A track jump controlling apparatus controls a track jump operation of an optical pickup, which is adapted to emit a light beam onto a recording medium of disc shape, receive a reflected or transmitted light from the optical disc and generate a tracking error signal. The track jump controlling apparatus is provided with: a tracking servo-controlling device, coupled to the optical pickup, for performing a tracking servo-control on the basis of the tracking error signal; a driving device for driving the optical pickup to move the light beam in a radial direction of the recording medium according to jump data including a kick pulse to accelerate the light beam and a brake pulse to decelerate the light beam; an eccentricity detecting device for detecting an amount of eccentricity of the recording medium, and outputting an eccentricity signal which indicates the amount of eccentricity; and a jump data generating device, coupled to the eccentricity detecting device and the driving device, for changing at least one of a pulse width and a crest value of the brake pulse on the basis of the eccentricity signal, and generating the jump data to the driving device.

13 Claims, 8 Drawing Sheets

TRACK JUMP CONTROLLING APPARATUS

BACKGROUND OF THE INVENTION

1. Field of the Invention

The present invention is related with a track jump controlling apparatus, which controls a track jump operation to move an optical pickup in the radial direction of a recording medium of disk shape.

2. Description of the Related Arts

An information reproducing apparatus for a recording medium of disk shape (hereinbelow, it is called as an optical disc), such as a LVD (Laser Vision Disk) and a CD (Compact Disk), is constituted as follows. Namely, the apparatus emits a laser light from a light source equipped in an optical pickup, to the optical disc, and obtains a RF (Radio Frequency) signal, a focus error signal, and a tracking error signal from the reflected light. By a control based on these obtained signals, special reproducing operations such as a still-picture reproduction, a slow reproduction, a double speed reproduction, etc. can be performed.

A track jump control is one of the indispensable techniques to perform the above-mentioned special reproducing operations. This track jump control is a control to move a beam spot, which is emitted from the optical pickup, to a desirable recording track (it is simply called as a "track" hereinbelow,) from a track where the present beam spot exists. More concretely, the track lump control is carried out by use of a kick pulse and a brake pulse, which have pulse widths, which correspond to the number of tracks to be jumped over, and predetermined crest values. These pulse widths and crest values are determined by the pitch between tracks of the optical disc, and the sensitivity of an actuator which drives the optical pickup. In case of 1 track jump, the pulse widths and crest values are set to draw an ideal velocity curve, in which the actuator can move the optical pickup in a minimum period of time to its adjacent track in a stable state. Here, the stable state means a state in which the velocity of the optical pickup i.e. the velocity of the beam spot, at the central line of the track of the jump destination becomes zero or becomes a value able to be adequately absorbed by a tracking servo-control as an external disturbance.

Nextly, the track jump control by an information recording and reproducing apparatus, will be explained with reference to FIG. 1. In this case, it is assumed that an information recording and reproducing apparatus has a tracking servo-loop to make the optical beam, for reading the record signal, track or follow a certain track on the optical disc, which is rotationally driven at a high speed, and that, in an initial state, the tracking servo-loop is in its closed state.

In order to simplify the explanation, it is also assumed that the actuator is a type without a spring system and ideally responds to an applied pulse.

For example, when a 1 track jump command is given, the micro computer for control, outputs a track jump command to change the tracking servo-loop to its open state. As shown in a time chart (a) of FIG. 1, the kick pulse KICK is applied to the actuator for driving the pickup. The kick pulse KICK has a polarity, which corresponds to the direction of the jump, a pulse width (=Tk) and a crest value (=current amount: IK) required for 1 track jump. As a result, the actuator starts the movement. Namely, if the kick pulse KICK is applied, the beam spot is moved in such a manner as to accelerate with a constant acceleration as shown in a time chart (b) of FIG. 1. When the tracking error signal obtained from the output signal of the pickup, arrives at the zero-crossing position as shown in a time chart (c) of FIG. 1, the brake pulse BRAKE is applied. The brake pulse BRAKE has a pulse width (=TB) and a crest value (=current amount: IB) required to apply the brake to the actuator, as shown in the time chart (a) of FIG. 1. Thereby, the beam spot decelerates with a constant deceleration as shown in the time chart (b) of FIG. 1. As shown in a chart (d) of FIG. 1, the tracking servo-loop is changed into its closed state at the center of the track i.e. at the time t2 (=the time when the time interval TB has elapsed from the time t1) when the velocity of the beam spot becomes zero. Then, the servo-control operation is performed, and the track jump is completed.

The above explanation has been made as for the case where the actual center of the optical disc and the rotation center of the spindle motor which rotationally drives the optical disc, are coincident to each other,- namely, as for the ideal case where the eccentricity of the optical disc does not exists. However, an eccentricity certainly exists in an actual optical disc. For this reason, if the direction of the movement of the actuator, and the direction of the eccentricity are coincident to each other, the relative velocity between the movement of the beam spot, and the optical disc becomes lower. On the other hand, if these directions are opposite to each other, the relative velocity becomes higher. Therefore, only by simply applying to the actuator the kick pulse and brake pulse having the fixed pulse width and the fixed crest value defined beforehand on the supposition of the above mentioned ideal case, the kick operation is not always changed to the brake operation precisely at the central-axis between the tracks (i.e. the center of the grooves shown in the chart (d) of FIG. 1). That is to say, such a situation may happen that the tracks are crossed over excessively by jump, or a desired track is not crossed by jump, so that the jump to an intermediate track is performed, and in an extreme case, the jump to an opposite direction is performed.

Figure 1:
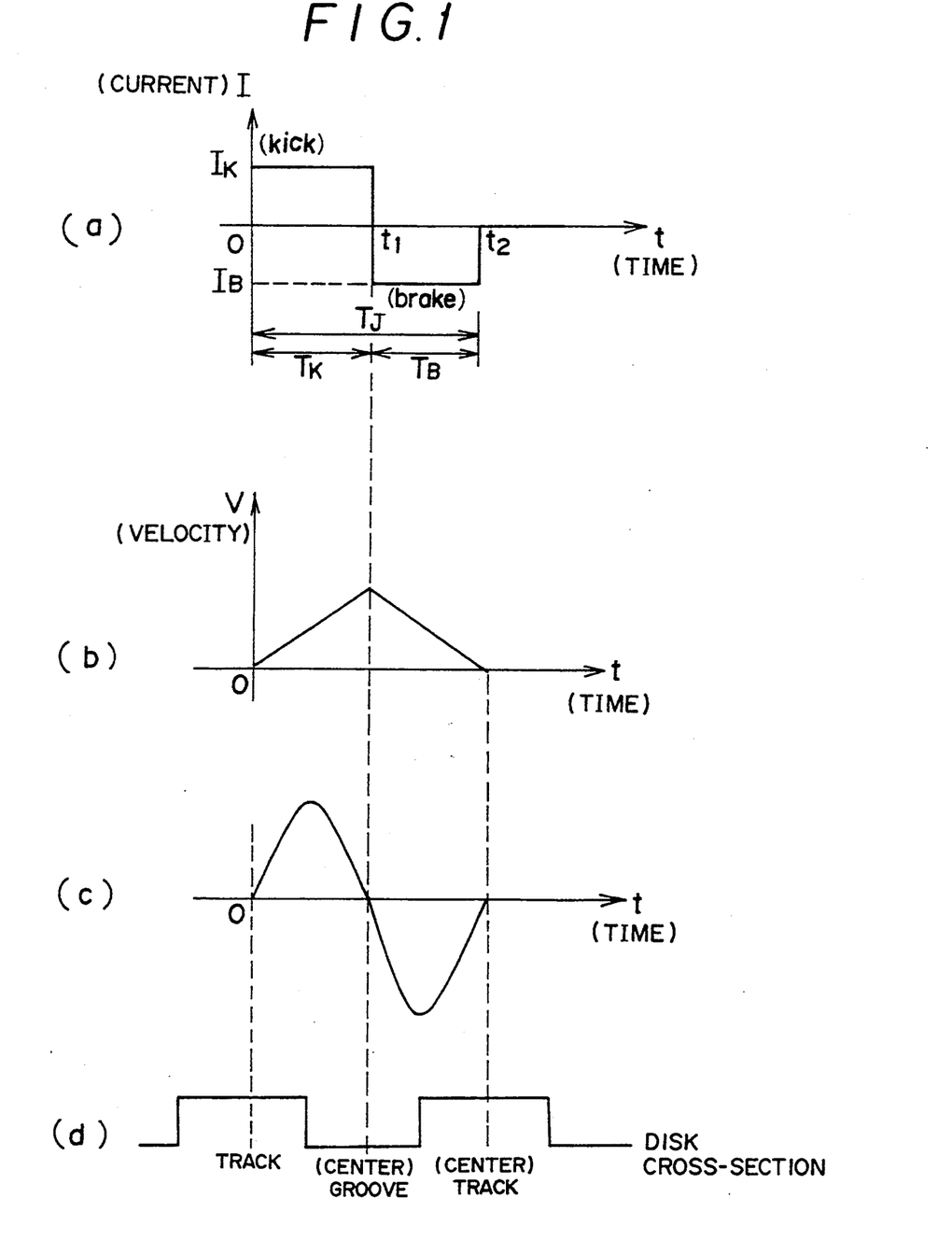

Therefore, the information recording and reproducing apparatus may be constituted to detect the central axis between the tracks by use of the tracking error signal, which can be obtained in connection with the movement of the beam spot (refer to the time chart (c) of FIG. 1 ), to apply the kick pulse KICK to the actuator until the apparatus detects the zero-crossing point of the tracking error signal, and to apply the brake pulse BRAKE after the zero-crossing point is detected.

Figure 2:
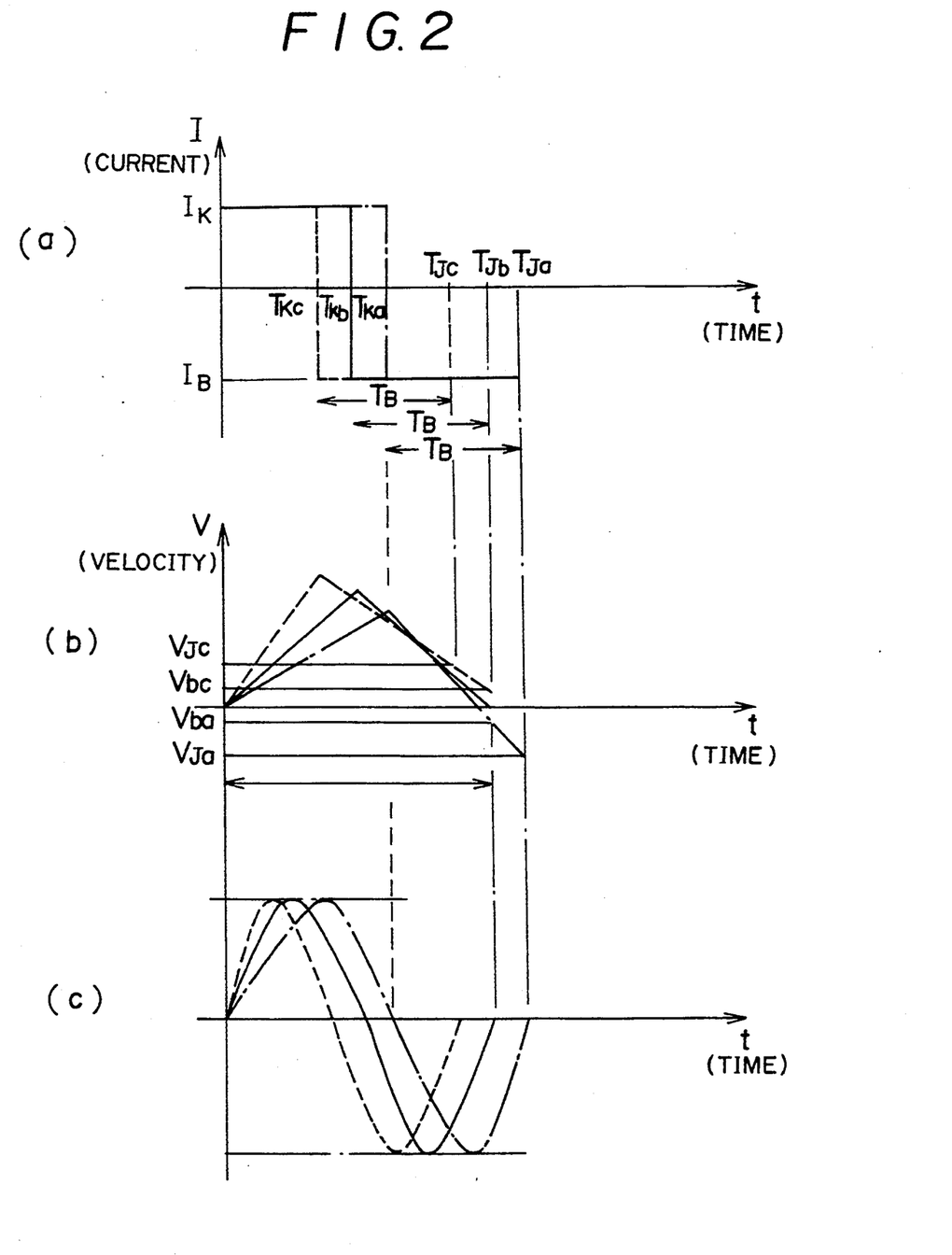

However, when the direction of the movement (fluctuation) of the track by the eccentricity of the optical disc, and the direction of the movement of the beam spot, are coincident to each other, in such an information recording and reproducing apparatus, the acceleration of the beam spot on the optical disc is cancelled at the time of acceleration as shown by a single chain line in a time chart (b) of FIG. 2. Thereby, as compared with the case where no eccentricity exists (as shown by a solid line in the time chart (b) of FIG. 2), the acceleration becomes less. On the contrary, the acceleration is added at the time of deceleration, so that , as compared with the case where no eccentricity exists, the acceleration becomes greater.

Similarly, when the direction of movement (fluctuation) of the track by the eccentricity of the optical disc, and the direction of the movement of the beam spot, are opposite to each other, the acceleration of the beam spot on the optical disc is added at the time of acceleration as shown by a dashed line in the time chart (b) of FIG. 2. Thereby, as compared with the case where no eccentricity exists, the acceleration becomes greater. On the contrary, the acceleration is cancelled at the time of deceleration, so that, as compared with the case where no eccentricity exists, the acceleration becomes less.

Apart from that, the kick pulse KICK is constituted such that the pulse width thereof is changed by the relative velocity, between the actuator and the optical disc, which changes due to the eccentricity. Therefore, if the brake pulse BRAKE, which has a fixed pulse width TB and a fixed crest value IB, is always applied at the center between the tracks (for example, the center of the grooves: the zero-crossing point of the tracking error) as shown in the charts (a) and (c) of FIG. 1 in case that the direction of the movement of the track by the eccentricity of the optical disc, and the direction of the movement of the beam spot, i.e. the actuator, are coincident to each other, as shown by the single chain line in the chart (b) of FIG. 2, the velocity is reduced too much. As the result, the velocity VJa to the opposite direction is remained at the jump destination. On the other hand, in case that these directions of the movement are opposite to each other, (as shown by the dashed line in the chart (b) of FIG. 2), the velocity cannot be adequately reduced so that the velocity VJc is remained at the jump destination. These residual velocities become external disturbances, from the viewpoint of the tracking servo-control, resulting in problems that the residual velocity cannot be fully absorbed by the tracking servo-control depending on the magnitude of the residual velocity, and that retracting to the target track after the jump operation, becomes unstable.

SUMMARY OF THE INVENTION

It is therefore an object of the present invention to provide a track jump controlling apparatus, which can stabilize the movement of the beam spot to the target track in the track jump operation. The more specific object of the present invention is to provide a track jump controlling apparatus, which is adapted to perform the track jump control in correspondence with the relative velocity between the optical disc and the actuator (i.e. the beam spot), which changes due to the eccentricity of the optical disc.

According to the present invention, the above object can be achieved by a first track jump controlling apparatus for controlling a track jump operation of an optical pickup, which is adapted to emit a light beam onto a recording medium of disc shape, receive a reflected or transmitted light from the optical disc and generate a tracking error signal. The first track jump controlling apparatus is provided with: a tracking servo-controlling device, coupled to the optical pickup, for performing a tracking servo-control on the basis of the tracking error signal; a driving device for driving the optical pickup to move the light beam in a radial direction of the recording medium according to jump data including a kick pulse to accelerate the light beam and a brake pulse to decelerate the light beam; an eccentricity detecting device for detecting an amount of eccentricity of the recording medium, and outputting an eccentricity signal which indicates the amount of eccentricity; and a jump data generating device, coupled to the eccentricity detecting device and the driving device, for changing at least one of a pulse width and a crest value of the brake pulse on the basis of the eccentricity signal, and generating the jump data to the driving device.

According to the present invention, the above object can be also achieved by a second track jump controlling apparatus for controlling a track jump operation of an optical pickup, which is adapted to emit a light beam onto a recording medium of disc shape, receive a reflected or transmitted light from the optical disc and generate a tracking error signal. The second track jump controlling apparatus is provided with: a tracking servo-controlling device, coupled to the optical pickup, for performing a tracking servo-control on the basis of the tracking error signal; a driving device for driving the optical pickup to move the light beam in a radial direction of the recording medium according to jump data including a kick pulse to accelerate the light beam and a brake pulse to decelerate the light beam; an eccentricity detecting device for detecting an amount of eccentricity of the recording medium, and outputting an eccentricity signal which indicates the amount of eccentricity; a calculating device, coupled to the eccentricity detecting device, for calculating at least one of a pulse width and a crest value of the brake pulse on the basis of the eccentricity signal, and outputting a calculation result signal; and a jump data generating device, coupled to the driving device and the calculating device, for generating the jump data including the brake pulse having the calculated pulse width or crest value, on the basis of the calculation result signal, to the driving device.

According to the first apparatus of the present invention, the eccentricity detecting device detects the amount of eccentricity of the optical disc which is rotationally driven by, for example, a spindle motor. Then, the eccentricity detecting device outputs the eccentricity signal indicating the amount of eccentricity, to the jump data generating device. When the eccentricity signal is inputted, the jump data generating device changes at least one of a pulse width and a crest value of the brake pulse on the basis of the eccentricity signal, and generates jump data to the driving device, or the tracking servo-controlling device. As the result, the brake control which corresponds to the amount of eccentricity, is performed. The tracking servo-controlling device performs the tracking servo-control of the optical pickup and the driving device drives the optical pickup, in response to the amount of eccentricity.

Consequently, the track jump control corresponding to the amount of eccentricity of the optical disc, can be performed according to the first apparatus of the present invention.

According to the second apparatus of the present invention, the eccentricity detecting device detects the amount of eccentricity of the optical disc. Then, the eccentricity detecting device outputs the eccentricity signal indicating the amount of eccentricity, to the calculating device. The calculating device computes at least one of the pulse width and the crest value of the brake pulse for controlling the movement of the optical pickup, on the basis of the amount of eccentricity, and outputs the calculation result signal to the jump data generating device. When the calculation result signal is inputted, the jump data generating device outputs the jump data including the brake pulse having thus calculated pulse width or crest value, to the driving device or the tracking servo-controlling device. As the result, the brake control which corresponds to the amount of eccentricity, is performed. The tracking servo-controlling device performs the tracking servo-control of the optical pickup and the driving device drives the optical pickup, in response to the amount of eccentricity.

Consequently, the track jump control corresponding to the amount of eccentricity of the optical disc, can be performed according to the second apparatus of the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1(a-d) is a timing chart for explaining a track jump control;

FIG. 2(a-c) is a timing chart for explaining an operation of a track jump controlling apparatus;

FIG. 5(a-e) is a timing chart for explaining the operation of the first embodiment;

FIG. 6(a-b) is a timing chart for explaining an operation principle of a second embodiment of the present invention;

DETAILED DESCRIPTION OF THE PREFERRED EMBODIMENTS

Nextly, the preferred embodiments of the present invention will be explained with reference to FIG. 2 to FIG. 8.

First Embodiment

First of all, the principle of the first embodiment is explained.

A relationship as expressed by the next expression (1) is effected between a time interval TJ required for a track jump, a time width i.e. a pulse width TK equivalent to a pulse width of a kick pulse, and a time width i.e. a pulse width TB equivalent to a pulse width of a brake pulse.

$$TJ = TK + TB \qquad (1)$$

In the present embodiment, the time interval TJ required for the track jump, is kept to be constant, regardless of the eccentricity of the optical disc, and retracting to a target track is stabilized by changing or adjusting the pulse width TK of the kick pulse, and the pulse width TB of the brake pulse. For example, as shown in FIG. 2, in case that the time interval TJ required for the track jump is set to be a time interval TJb required for the track jump in case where no eccentricity of the optical disc exists (TJ=TJb), and that the pulse width TK of the kick pulse is set to be TKa or TKc, respectively (TKa>TKb>TKc: TKb is the pulse width of the kick pulse in case where no eccentricity of the optical disc exists), the residual velocity of the beam spot after the time TJb, becomes a velocity Vba or Vbc respectively. As compared with the residual velocities VJa and VJc of the beam spot of the zero-crossing point of the tracking error signal shown in the chart (b) of FIG. 2, it is understood that the absolute value of the velocity Vba or Vbc becomes little.

As explained above, it is possible to stabilize the track jump by keeping constant the time interval TJ required for the track jump, and by changing the pulse width of the kick pulse and the pulse width of the brake pulse in correspondence with the amount of the eccentricity of the optical disc.

Nextly, the first embodiment based on the above mentioned principle will be explained in detail, referring to FIGS. 3 to 5 and FIG. 2.

Figure 3:
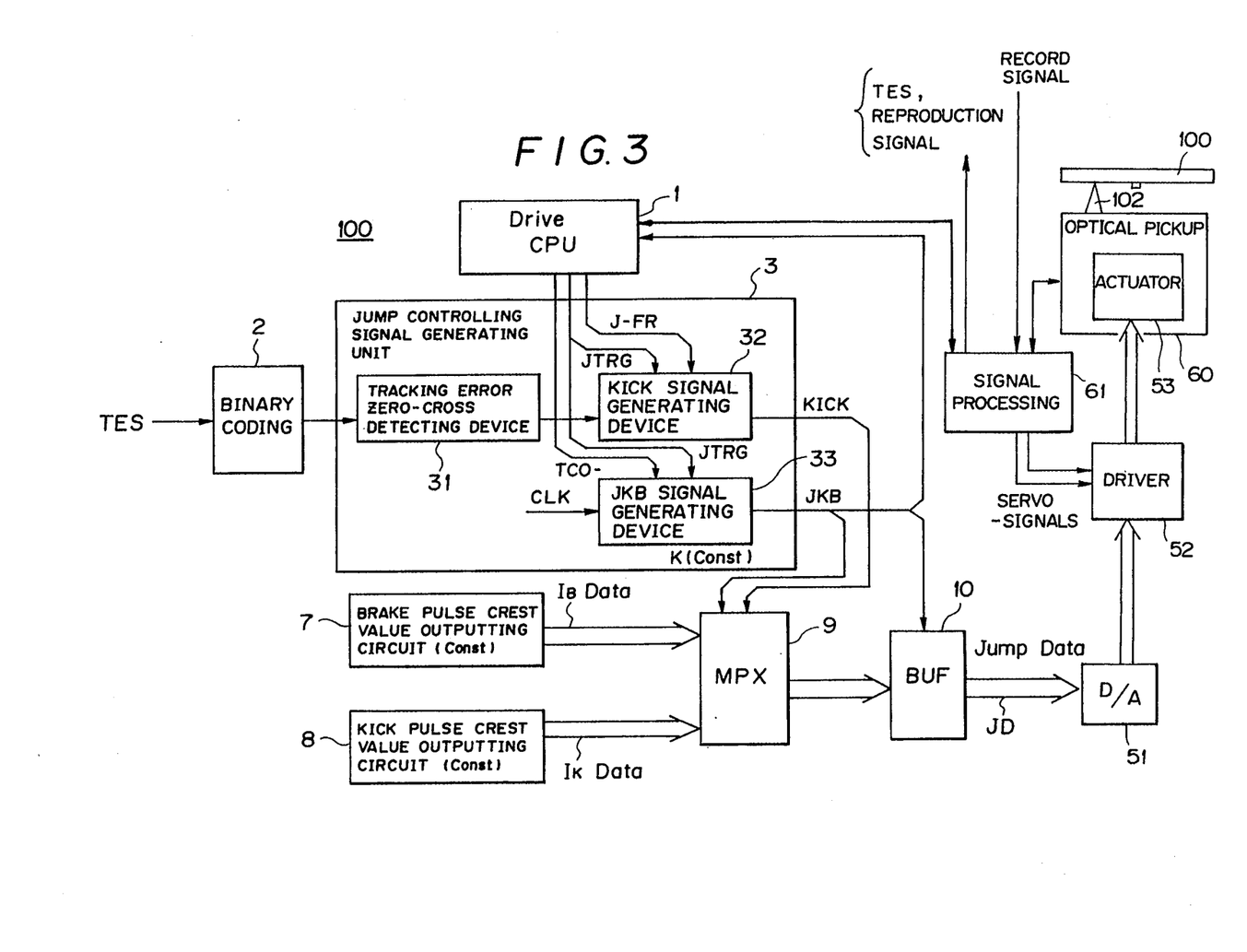
FIG. 3 is an outline constitution block diagram of a track jump controlling apparatus of a first embodiment of the present invention.

FIG. 3 is an outline constitution block diagram of a track jump controlling apparatus 100.

The track jump controlling apparatus 100 is provided with a drive CPU 1, a binary coding device 2, a jump controlling signal generating unit 3, a brake pulse crest value outputting circuit 7, a kick pulse crest value outputting circuit 8, a multiplexer 9, and a buffer 10.

The buffer 10 is coupled through a D/A converter 51 to a driver 52 for driving an actuator 53 of an optical pickup 60. The optical pickup 60 emits a light beam 102 to an optical disc 100, which is rotationally driven by a motor, and detects the reflected light from the optical disc 100. The detected signal is inputted to a signal processing unit 61, which is adapted to process the detected data to output the reproduction data and a tracking error signal TES. The signal processing unit 61 is adapted to supply the tracking servo-signal as well as the focus servo-signal to the driver 52, so that the driver 52 performs the tracking and focus servo control of the optical pickup 60. The signal processing unit 61 is also adapted to receive the record signal from the external to write the signal onto the optical disc 100.

The drive CPU 1 performs various controls, such as a jump control, a focus servo-control, and a tracking servo-control. The binary coding device 2 converts a tracking error signal TES, which is generated by a push-pull method, a three beam method, etc. and is inputted from the signal processing unit 60, into a binary value of a "H" level or "L" level with respect to a predetermined threshold value (for example, grand level). The jump controlling signal generating unit 3 performs a detection and a generation of a signal required for the track jump control. The brake pulse crest value outputting circuit 7, outputs data IB for generating a brake pulse which has a constant crest value. The kick pulse crest value outputting circuit 8 outputs data IK for generating a kick pulse, which has a constant crest value. The multiplexer 9 outputs either the data IB for generating the brake pulse or the data IK for generating the kick pulse, selectively on the basis of a kick pulse controlling signal KICK and a brake pulse controlling signal JKB, which are explained later in detail. The buffer 10 outputs the signal outputted from the multiplexer 9, as jump data.

The jump controlling signal generating unit 3 is provided with a tracking error zero cross detecting device 31, a KICK signal generating device 32, and a JKB signal generating device 33.

The tracking error zero-cross detecting device 31 detects the zero-crossing point of the tracking error signal TES on the basis of the output signal of the binary coding device 2. The KICK signal generating device 32 generates and outputs the kick pulse control signal KICK. The JKB signal generating device 33 generates and outputs the brake pulse control signal JKB.

Nextly, the operation of thus constructed first embodiment, as for the case of performing 1 track jump, will be explained with reference to an operation flow chart of FIG. 4.

Figure 4:
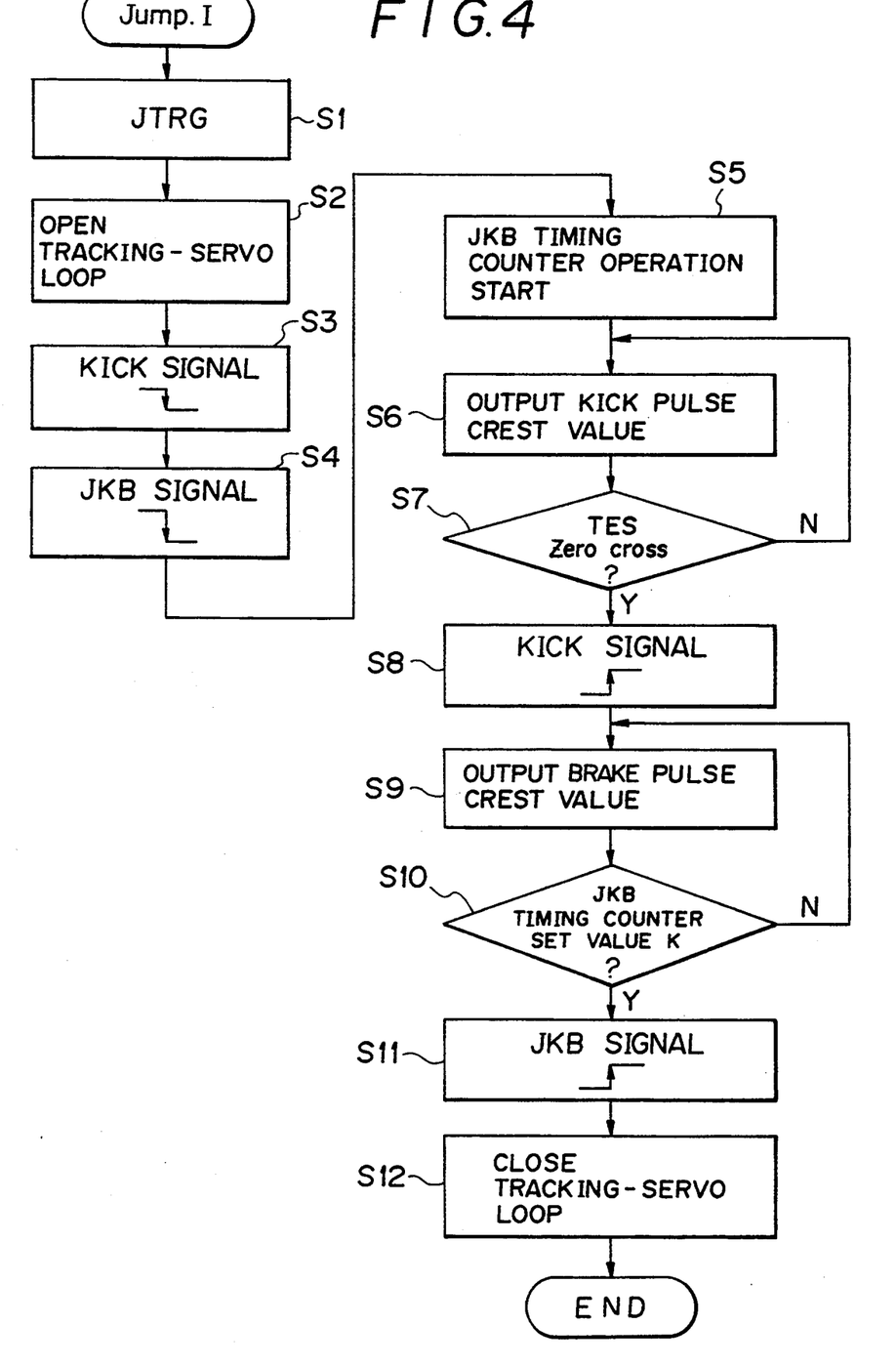
FIG. 4 is a flow chart of an operation of the first embodiment.

In FIG. 4, a jump starting signal JTRG is outputted from the drive CPU 1 to the KICK signal generating device 32 and the JKB signal generating device 33 (step S1). At the same time, the tracking servo-loop, becomes in its open state (step S2). In the track jump controlling apparatus, when the jump starting signal JTRG is inputted, the KICK signal generating device 32 detects the build up transition of the jump start signal JTRG. Then, the KICK signal generating device 32 outputs the kick pulse controlling signal KICK of the "L" level (step S3). On the other hand, when the jump starting signal JTRG is inputted, the JKB signal generating device 33 detects the build up transition of the jump start signal JTRG. Then, the JKB signal generating device 33 outputs the brake pulse controlling signal JKB of the "L" level (step S4). These kick pulse controlling signal KICK and jump pulse controlling signal JKB, are outputted to the selection terminals of multiplexer 9, respectively.

When the Jump starting signal JTRG is inputted to the JKB signal generating device 33, it starts the measurement of the elapsing time from the time of starting the track jump by an internal timing counter, so that it can judges whether the time interval TJ required for the track jump defined beforehand has elapsed from the time of starting the track jump, or not (Step S5).

When the kick pulse controlling signal KICK of the "L" level, and the jump pulse control signal JKB of the "L" level, are inputted, the multiplexer 9 selects the output of the KICK pulse crest value outputting device 8, so that the data IK for the kick pulse generation, which has a constant crest value, is outputted to the buffer 10. As the result, the buffer 10 outputs the inputted data IK for the kick pulse generation, which has the constant crest value, as the jump data JD (step S6).

Figure 5:
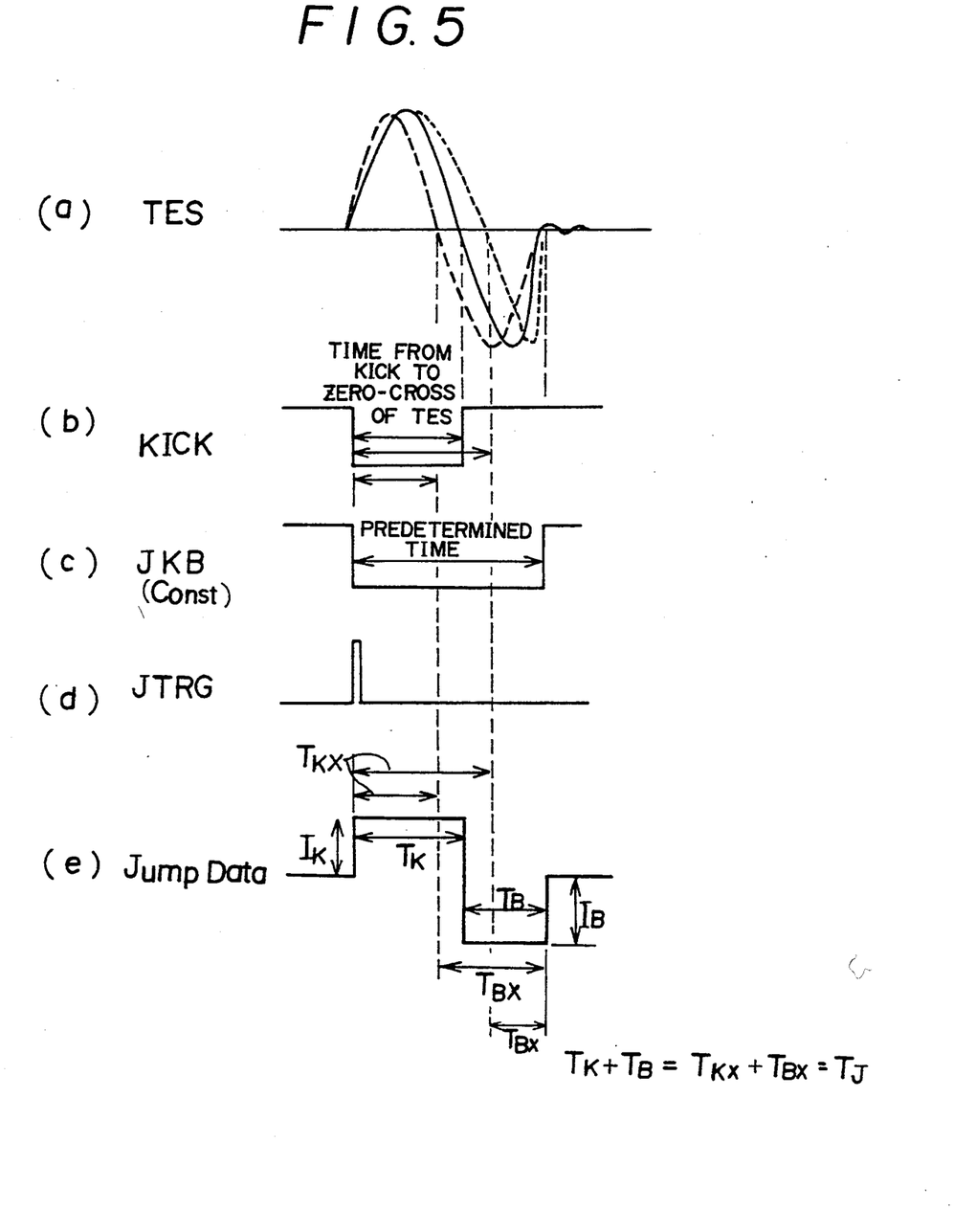

The jump data JD outputted from the buffer 10 is converted into an analog jump signal through the D/A converter 51. Then, the analog jump signal is applied to the driver 52 of the actuator 53, so that the beam spot on the optical disc 100 is moved. The tracking error signal TES as shown in the chart (a) of FIG. 5, is obtained from the optical pickup 60 through the signal processing unit 61. In the figure, the tracking error signal TES indicates the signal in case where the actuator 60 moves in the radial direction of the optical disc 100 to cross the track in the direction toward the inner circumference. When the actuator 60 crosses in the direction toward the outer circumference, the tracking error signal TES having reverse polarity, is obtained.

Corresponding to the voltage level, the tracking error signal TES is converted into binary value of the "H" level or the "L" level, by the binary coding device 2. This converted signal is inputted to the tracking error zero-cross detecting device 31 in the jump controlling signal generating unit 3.

The tracking error zero-cross detecting device 31 detects the edge of the binary coded tracking error signal TES (step S7). Then, the tracking error zero-cross detecting device 31 outputs the detected signal to the KICK signal generating device 32, as a zero-cross detection signal.

As the result, the KICK signal generating device 32 changes the kick pulse controlling signal KICK from the "L" level to the high "H" level (step S8). Namely, the kick pulse controlling signal KICK is such a signal as is kept at the "L" level from the time of starting the jump until the tracking error signal TES carries out zero crossing. If the relative velocity between the optical disc and the actuator (i.e. the beam spot) becomes higher, the pulse width of the kick pulse controlling signal KICK becomes shorter. On the contrary, if the relative velocity between the optical disc and the actuator becomes lower, the pulse width of the kick pulse controlling signal KICK becomes longer. That is to say, this kick pulse controlling signal KICK is such a signal as changes in correspondence with the amount of the eccentricity of the optical disc.

By the level change of the kick pulse controlling signal KICK, the multiplexer 9 selects the data IB for generating the brake pulse, which is outputted from the brake pulse crest value outputting circuit 7, and has a constant crest value, and outputs it to the buffer 10 (step S9).

The data IB for generating the brake pulse is outputted as the jump data JD through the buffer 10. When the data IB is inputted, the actuator 53 shifts to the brake operation.

When it has elapsed the time interval TJ required for the track jump, the brake pulse controlling signal JKB is changed from the "L" level to the "H" level (step S10). The output of the jump data JD from the buffer 10 is prohibited. Alternatively, the jump data JD outputted from the buffer 10 is fixed to a constant value, so as to make the voltage level of the analog jump signal be a zero level (step S11). The drive CPU 1 detects the build up transition of the brake pulse controlling signal JKB from the "L" level to the "H" level, closes the tracking servo-loop, and completes the track jump (step S12).

In short, the brake pulse controlling signal JKB is the signal which becomes the "L" level during the term of jumping, and which pulse width expresses the time interval TJ required for the track jump.

As mentioned above in detail, according to the present embodiment, the pulse width of the brake pulse controlling signal JKB is determined uniquely as a predetermined time interval from the build up transition of the jump starting signal JTRG. The brake term TB is equivalent to a term obtained by subtracting the kick pulse output time TK from the time interval TJ required for the track jump, as guided from the expression (1). Therefore, the brake term TB changes according to the change of the kick pulse output time TK, i.e. the change of the amount of the eccentricity of the optical disc.

The aforementioned timing counter in the jump controlling signal generating unit 3, is realizable by, for example, a constitution of counting a standard clock by a counter, or a multi-vibrator for generating the pulse of predetermined time width. In short, as the timing counter, such a construction is enough that can measure the predetermined time interval after the build up transition of the jump starting signal JTRG.

Second Embodiment

The above mentioned first embodiment is adapted to change the pulse width of the brake pulse in order to make the track jump operation stable. On the contrary, this second embodiment is adapted to fix the pulse width of the brake pulse and change the crest value of the brake pulse.

Figure 6:
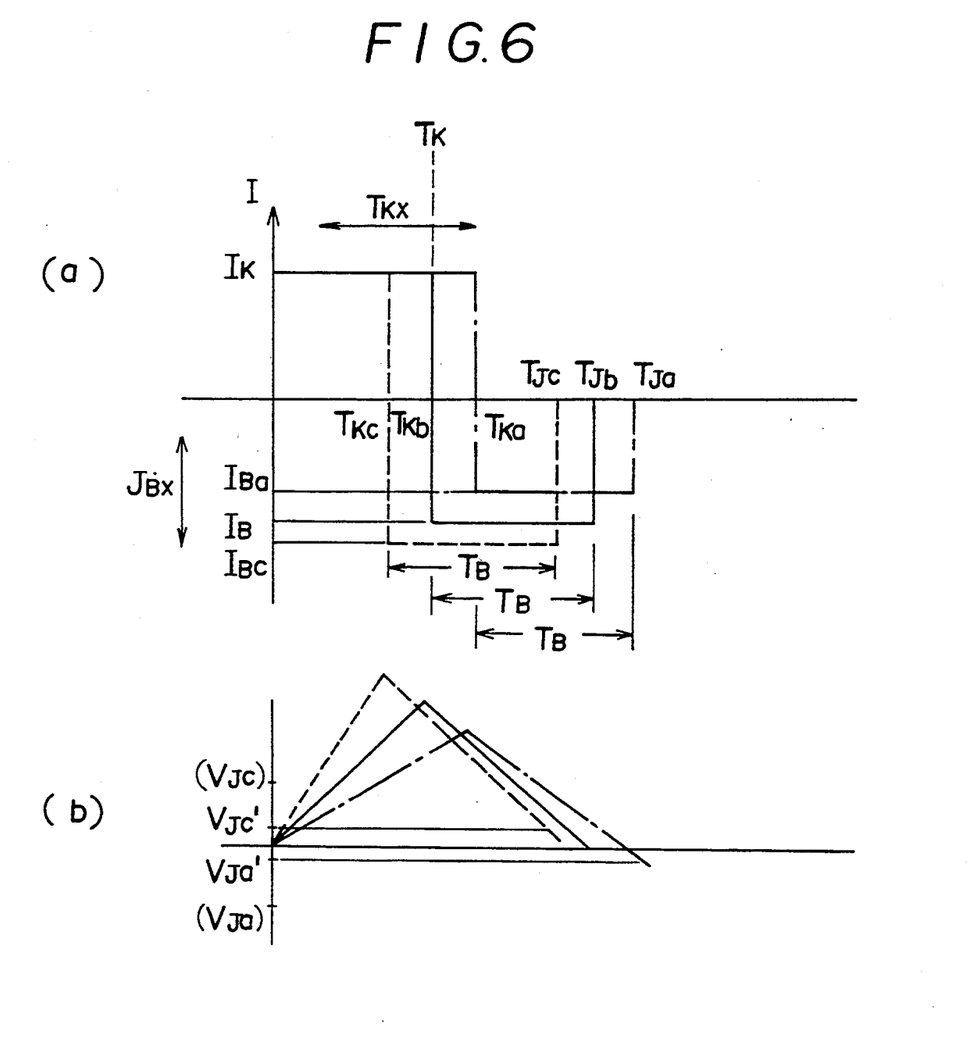

Firstly, the principle of the second embodiment will be explained with reference to FIG. 6.

As mentioned above, since the pulse width of the kick pulse is changed by detecting the zero-crossing point of the tracking error signal TES, the difference AT between the pulse width of the kick pulse and the standard kick pulse width, corresponds to the change in the amount of the eccentricity of the optical disc. Such a difference AT is given by an expression (2).

$$\Delta T = TK - TKX \quad (2)$$

Here, TK is a kick pulse width in case where no eccentricity exits (standard kick pulse width). TKX is a kick pulse width which changes according to the amount of the eccentricity.

The crest value IBX of the brake pulse, which should be applied to the actuator at this time, is given by the following expression (3), in which the crest value IBX is proportional to the acceleration of the actuator.

$$IBX = \Delta T \times C + IB \quad (3)$$

Here, IB is the crest value of the brake pulse in case where no eccentricity exits, and C is a proportional constant.

AT becomes a negative component when the direction of the movement of the actuator and the direction of the eccentricity, are coincident to each other. Thus, in this case, the crest value IBX becomes less than the crest value IB. On the other hand, ΔT becomes a positive component when the direction of the movement of the actuator and the direction of the eccentricity, are opposite to each other. Thus, in this case, the crest value IBX becomes greater than the crest value IB. Therefore, the braking operation can be performed with the acceleration, which cancels the change in the amount of the acceleration due to the eccentricity, by setting the proportional constant C to the optimum value. Thus, as shown in a chart (b) of FIG. 6, by use of the pulse width TB of the brake pulse which is set when there is no eccentricity of the optical disc, the velocity of the actuator i.e. the residual velocities VJc' and VJa' of the beam spot, can be made much smaller than the residual velocities VJc and VJa shown in the chart (b) of FIG. 2, so that the retraction to the target track is certainly enabled, and the stable track jump operation can be performed.

Nextly, with reference to FIGS. 7 and 8, the second embodiment using the above mentioned principle, will be explained in detail.

Figure 7:
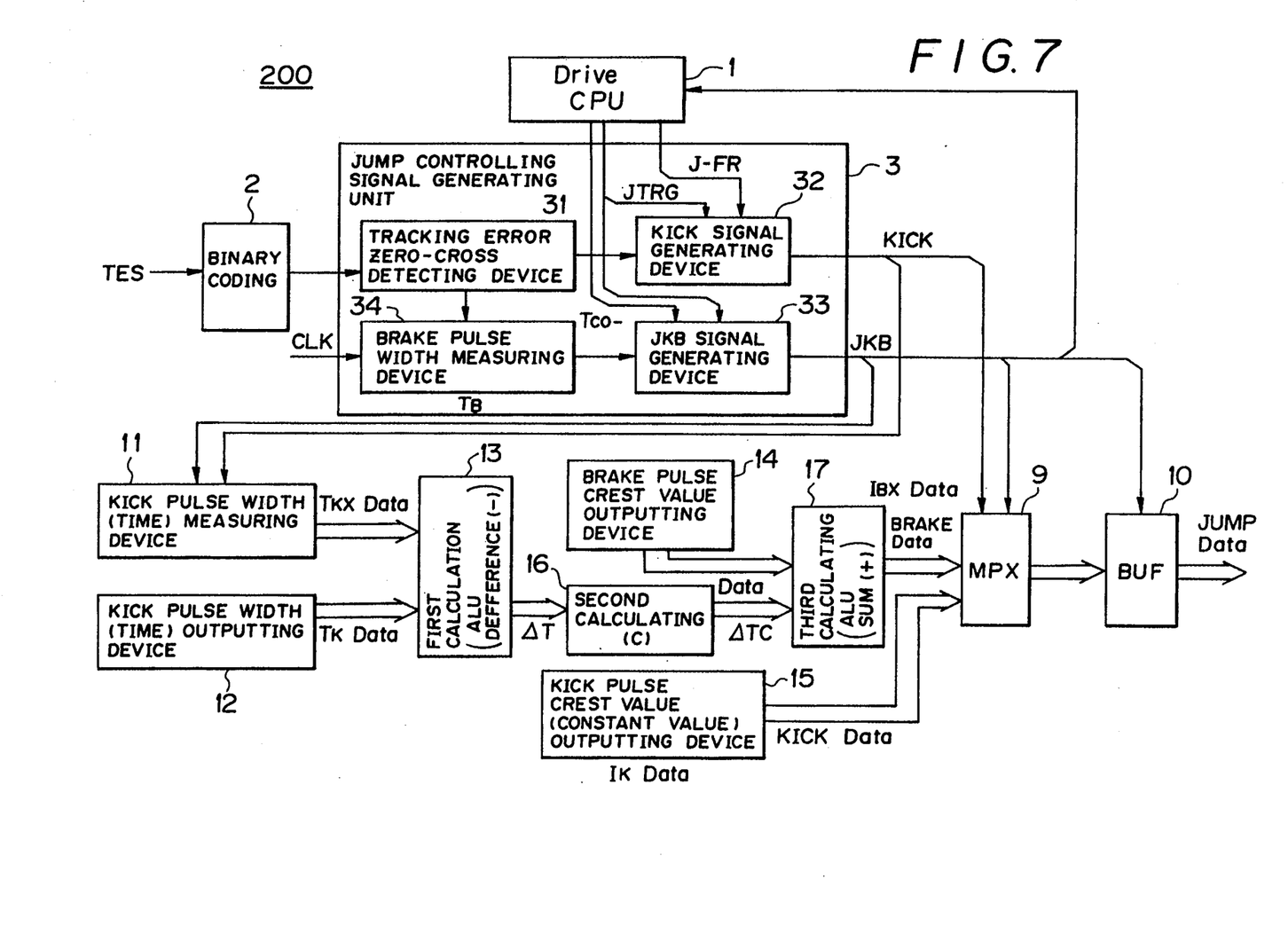
FIG. 7 is an outline constitution block diagram of a track jump controlling apparatus of the second embodiment.
Figure 8:
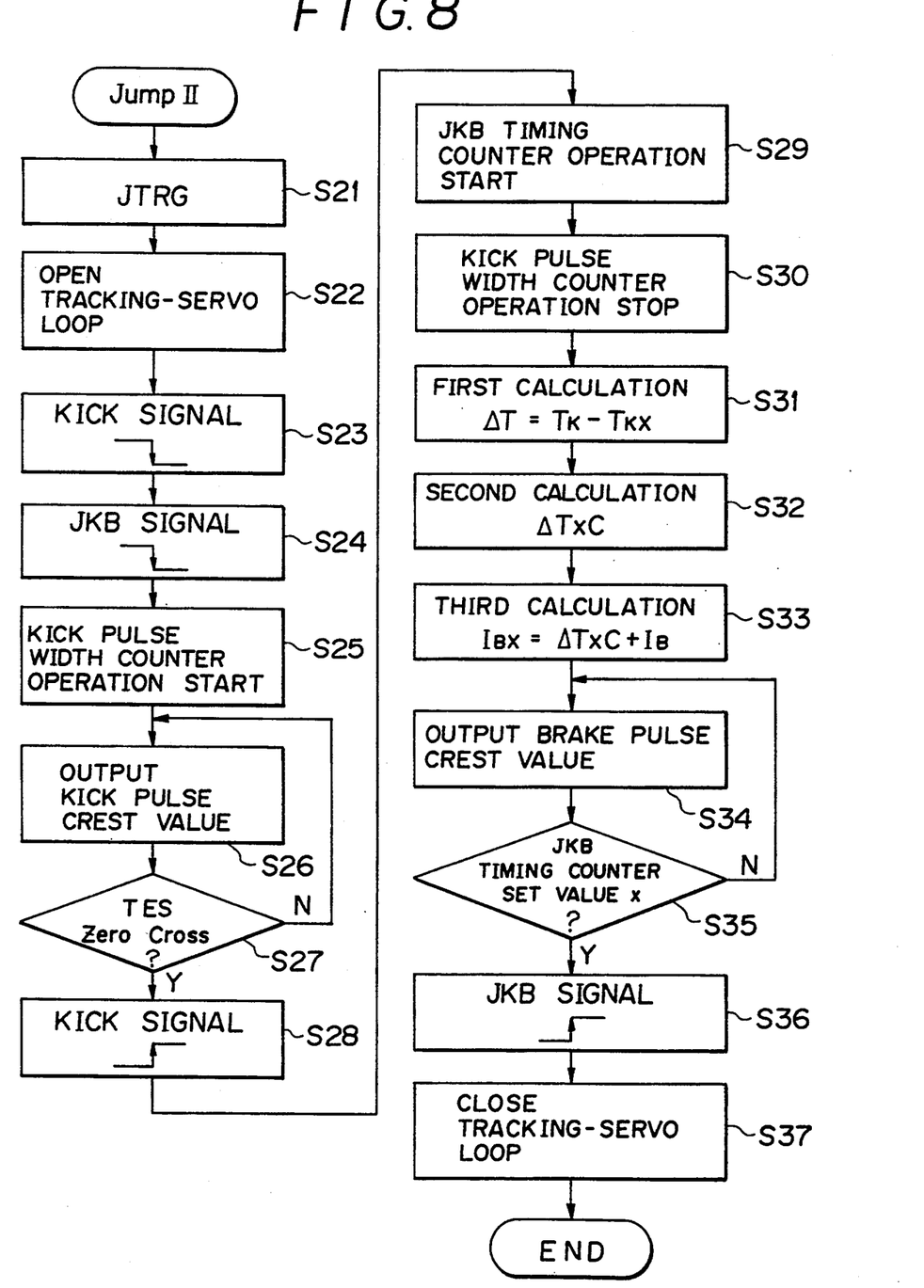
FIG. 8 is a flow chart of an operation of the second embodiment.

FIG. 7 is the outline constitution block diagram of the track jump controlling apparatus of the second embodiment. In FIG. 7, the same constitutional elements as those in FIG. 3, carry the same reference numerals and the explanations thereof are omitted. The operation in the case where 1 track jump is performed, will be explained in the following explanation.

In FIG. 7, a track jump controlling apparatus 200 is provided with a brake pulse width measuring device 34, a KICK pulse width measuring device 11, a KICK pulse width outputting device 12, a first calculating device 13, a brake pulse crest value outputting device 14, a second calculating device 16, a third calculating device 17 and a KICK pulse crest value outputting device 15.

When the zero-cross detection signal is inputted from the tracking error zero-cross detecting device 31, the brake pulse width measuring device 34 measures the pulse width of the brake pulse. The Kick pulse width measuring device 11 measures the time width of the kick pulse controlling signal KICK, which changes according to the amount of the eccentricity of the optical disc, and outputs the result as calculation data TKX. The KICK pulse width outputting device 12 outputs standard time data TK (equivalent to the TK in the expression (2)). The first calculating device 13, the second calculating device 16, and the third calculating devices 17, are the calculating devices for calculating the expressions (2) and (3). The KICK pulse crest value outputting device 15 outputs a standard crest value, which is equivalent to the crest value IB expressed by the expression (3).

Nextly, the operation of thus constructed second embodiment, will be explained with reference to a flow chart of FIG. 8.

Firstly, the drive CPU 1 outputs the jump starting signal JTRG to the jump controlling signal generating unit 3 (step S21). The drive CPU 1 changes the tracking servo-loop to its open state (step S22).

When the jump starting signal JTRG is inputted, the KICK signal generating device 32 in the jump controlling signal generating unit 3, outputs the kick pulse controlling signal KICK of the "L" level to the selection terminal of the multiplexer 9 (step S23). Similarly, the JKB signal generating device 33 outputs the brake pulse controlling signal JKB of the "L" level to the selection terminal of the multiplexer 9 (step S24).

On the other hand, the kick pulse controlling signal KICK and the brake pulse controlling signal JKB, are also outputted to the kick pulse width measuring device 11, and the measurement of the pulse width of the kick pulse controlling signal KICK is started (step S25).

The multiplexer 9 selects the data IK for the kick pulse generation, which is inputted from the kick pulse crest value outputting circuit 15 and has a constant crest value, and outputs it as the jump data JD through the buffer 10 (step S26).

As aforementioned, the jump data JD outputted from the buffer 10 is applied to the driver for the actuator of the optical pickup, so that the beam spot moves and the tracking error signal TES is outputted.

When the tracking error zero-cross detecting device 31 detects the zero-crossing point of the tracking error signal TES (step S27), it outputs a zero-cross detection signal to the KICK signal generating device 32 and the JKB signal generating device 33. As a result, the kick pulse controlling signal KICK is changed from the "L" level to the "H" level (step S28).

On the other hand, when the zero-cross detection signal is inputted, the brake pulse width measuring device 34 starts to measure the time in order to manage the time after the output of the brake pulse is started until it is stopped, by the internal timing counter (step S29).

When the kick pulse controlling signal KICK changes to the "H" level, the kick pulse width measuring device 11 stops its measuring operation (step S30).

As mentioned above, the kick pulse controlling signal KICK is a signal holding the "L" level, from the start of track jump until the tracking error signal TES carries out zero-crossing. The pulse width of the kick pulse controlling signal KICK changes corresponding to the amount of the eccentricity of the optical disc, and is equivalent to the TKX in the expression (2).

On the other hand, when the kick pulse controlling signal KICK changes to the "H" level, the kick pulse width measuring device 11 outputs the time data corresponding to the pulse width of the measured kick pulse (=count value) to one input terminal of the first calculating device 13. At the same time, the standard value TK, which is set by the KICK pulse width outputting device 12, is inputted-to the other input terminal of the first calculating device 13. As the standard value TK, the pulse width of the kick pulse in case that, for example, no eccentricity exists, is inputted.

The first calculating device 13 calculate the difference of these two input signals i.e. performs the calculating operation according to the expression (2), and outputs the resultant difference AT to the second calculating device 16 (step S31).

A second calculating device performs the multiplying operation of the difference data AT and the proportional constant C, and outputs the multiplication data, which is the multiplication result, to the third calculating device 17 (step S32).

The third calculating device 17 performs the adding operation of the multiplication data and the crest value of the brake pulse in case where no eccentricity exists, which is outputted from the brake pulse crest value outputting device 14. Then, the third calculating device 17 outputs the resultant addition data to the multiplexer 9 (step S33). This addition data outputted from the third calculating device 17 is equivalent to the crest value IBX in the expression (3).

As the output of the multiplexer 9, the output of the third calculating device 17 i.e. the crest value IBX in which the eccentricity is corrected, is selected by the change to the "H" level of the kick pulse controlling signal KICK, and is outputted as the jump data JD through the buffer 10. Therefore, the actuator shifts to the braking operation in response to this jump data JD (step S34).

When the predetermined time is elapsed (step S35), the timing counter of the brake pulse width measuring device 34 outputs a time progress signal to the JKB signal generating device 33. The JKB signal generating device 33 changes the brake pulse controlling signal JKB from the "L" level to the "H" level in response to this (step S36). Thereby, the output from the buffer 10 is prohibited (or, it is fixed to a predetermined level), and, at the same time, the count value of the kick pulse width measuring device is cleared. The drive CPU 1 detects the build up transition from the "L" level to the "H" level of the JKB signal. Then, the drive CPU 1 closes the tracking servo-loop and ends the track jump operation (step S37). In this case, the brake pulse controlling signal JKB is the signal which becomes the "L" level during the jump term. The pulse width of the signal brake pulse controlling signal JKB represents the time obtained by adding the brake term, which is fixed, to the kick term, which varies according to the eccentricity.

The aforementioned brake pulse width measuring device may be realizable by, for example, a constitution of counting a standard clock by a counter, or a multivibrator for generating the pulse of predetermined time width.

By the above described construction, the crest value of the brake pulse corresponding to the amount of the eccentricity of the optical disc, which is given by the expression (3), is obtained and thus the stable track jump operation can be realizable.

In the second embodiment, the case where the crest value of the brake pulse is changed in correspondence with the pulse width of the kick pulse i.e. the difference of the amount of the eccentricity of the optical disc by use of the expression (3), has been described. However, the same advantageous effect can be achieved by use of the rate of change in the amount of the eccentricity as expressed by a following expression (4), in place of the difference of the amount of the eccentricity.

$$IBX = C \times IB \times TK/TKX \qquad (4)$$

In short, by employing such a construction as to determine the crest value of the brake pulse in correspondence with the amount of change in the kick pulse, which varies according to the amount of the eccentricity of the optical disc, the track jump operation can be made stable.

As described above in detail, by changing at least one of the pulse width or the crest value of the brake pulse in correspondence with the time interval until the zero-cross of the tracking error signal which corresponds to the eccentricity of the optical disc, since, if the velocity of the beam spot entering the target track is high, the brake is applied more strongly, and since, if the velocity is low, the brake is applied more weakly, the track jump operation can be performed in a quite stable manner with no or little influence of the eccentricity, according to the present embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A track jump controlling apparatus for controlling a track jump operation of an optical pickup, which is adapted to emit a light beam onto a recording medium of disc shape, receive a reflected or transmitted light from said recording medium and generate a tracking error signal, said apparatus comprising:

a tracking servo-controlling means, coupled to said optical pickup, for performing a tracking servo-control on the basis of the tracking error signal;

a driving means for driving said optical pickup to move the light beam in a radial direction of said recording medium according to jump data comprising a kick pulse to accelerate the light beam and a brake pulse to decelerate the light beam;

a zero-cross detecting means for detecting a zero cross of the tracking error signal;

a drive CPU for giving a jump command to start the track jump operation;

a first generating means for generating a kick pulse controlling signal from when the jump command is given by said drive CPU until the zero-cross is detected by said zero-cross detecting means;

a second generating means for generating a brake pulse controlling signal for a predetermined time interval after the jump command is given by said drive CPU;

a first outputting means for outputting a first signal having a constant crest value of the kick pulse;

a second outputting means for outputting a second signal having a constant crest value of the brake pulse; and a multiplexer for multiplexing the first and second signals to output the kick pulse of the constant crest value while the kick pulse controlling signal is generated, and output the brake pulse of the second constant crest value while the brake pulse controlling signal is generated and the kick pulse controlling signal is not generated.

2. An apparatus according to claim 1, wherein said tracking servo-controlling means is coupled to said drive CPU, and opens a servo loop when the jump command is given from said drive CPU.

3. An apparatus according to claim 1, wherein said second generating means measures the predetermined time interval by counting clocks to generate the brake pulse controlling signal.

4. An apparatus according to claim 1, wherein said second generating means generates, as the brake pulse controlling signal, a pulse, the width of which is equal to the predetermined time interval.

5. An apparatus according to claim 1, wherein each of the kick pulse controlling signal and the brake pulse controlling signal, is a signal which is turned to be a high level or a low level.

6. A track jump controlling apparatus for controlling a track jump operation of an optical pickup, which is adapted to emit a light beam onto a recording medium of disc shape, receive a reflected or transmitted light from said recording medium and generate a tracking error signal, said apparatus comprising:

a tracking servo-controlling means, coupled to said optical pickup, for performing a tracking servo-control on the basis of the tracking error signal;

a driving means for driving said optical pickup to move the light beam in a radial direction of said recording medium according to jump data comprising a kick pulse to accelerate the light beam and a brake pulse to decelerate the light beam;

a zero-cross detecting means for detecting a zero cross of the tracking error signal;

a drive CPU for giving a jump command to start the track jump operation;

a first generating means for generating a kick pulse controlling signal from when the jump command is given by said drive CPU until the zero-cross is detected by said zero-cross detecting means;

a second generating means for generating a brake pulse controlling signal from when the jump command is given by said drive CPU until a predetermined time interval has passed after the zero-cross is detected by said zero-cross detecting means;

a pulse width measuring means for measuring a pulse width of the kick pulse by measuring the time duration of the kick pulse controlling signal generated by said first generating means;

a pulse width outputting means for outputting a predetermined standard pulse width for the kick pulse;

a calculating means, coupled to said pulse width measuring means and said pulse width outputting means, for calculating a crest value of the brake pulse on the basis of a change of the measured pulse width relative to the standard pulse width to compensate the relative change; and a jump data generating means, coupled to said driving means and said calculating means, for generating the jump data including the brake pulse having the calculated crest value, to said driving means.

7. An apparatus according to claim 6, further comprising a first outputting means for outputting a first signal having a constant crest value of the kick pulse, wherein said jump data generating means comprises a multiplexer for multiplexing the first signal and the calculated crest value to output the kick pulse of the constant crest value while the kick pulse controlling signal is generated, and output the brake pulse of the calculated crest value while the brake pulse controlling signal is generated and the kick pulse controlling signal is not generated.

8. An apparatus according to claim 6, further comprising a second outputting means for outputting a second signal having a predetermine standard crest value for the brake pulse, wherein said calculating means calculates the crest value of the brake pulse as a predetermined function of the standard crest value for the brake pulse and the relative change of the pulse width of the kick pulse.

9. An apparatus according to claim 8, wherein said calculating means calculates the crest value of the brake pulse on the basis of the difference between the measured pulse width of the kick pulse and the standard pulse width for the kick pulse, according to the following expression, $$IBX = (TK - TKX) \times C + IB$$

wherein, IBX is the crest value of the brake pulse,
TK is the standard pulse width for the kick pulse,
TKX is the measured pulse width of the kick pulse,
C is a proportional constant, and
IB is the standard crest value for the brake pulse.

10. An apparatus according to claim 8, wherein said calculating means calculates the crest value of the brake pulse on the basis of the ratio of the measured pulse width and the standard pulse width for the kick pulse, according to the following expression, $$IBX = C \times IB \times TK/TKX$$

wherein, IBX is the crest value of the brake pulse,
C is a proportional constant,
IB is the standard crest value for the brake pulse,
TK is the standard pulse width for the kick pulse, and
TKX is the measured pulse width of the kick pulse.

11. An apparatus according to claim 6, wherein said tracking servo-controlling means is coupled to said drive CPU, and opens a servo loop when the jump command is given from said drive CPU.

12. An apparatus according to claim 6, wherein said second generating means measures the predetermined time interval by counting clocks to generate the brake pulse controlling signal.

13. An apparatus according to claim 6, wherein each of the kick pulse controlling signal and the brake pulse controlling signal, is a signal which is turned to be a high level or a low level.

* * * * *